United States Patent
Lavelle

[15] 3,696,364
[45] Oct. 3, 1972

[54] SAFETY DEVICE MONITORING SYSTEM

[72] Inventor: Michael R. Lavelle, 9331 North Delaware St., Indianapolis, Ind. 46240

[22] Filed: June 21, 1971

[21] Appl. No.: 154,734

[52] U.S. Cl. ........... 340/252 R, 340/213 R, 340/236, 340/240, 340/256
[51] Int. Cl. ............................................. G08b 21/00
[58] Field of Search ...... 340/248, 250, 252, 256, 253, 340/213 R, 415, 255; 200/167; 317/9 D, 36 TD; 307/92–94, 131

[56] References Cited

UNITED STATES PATENTS

| | | | |
|---|---|---|---|
| 3,434,010 | 3/1969 | Weit | 317/36 TD X |
| 3,548,289 | 12/1970 | Liska et al. | 340/253 A X |
| 3,548,399 | 12/1970 | Monigal et al. | 340/415 X |
| 3,611,036 | 10/1971 | Edson | 340/255 X |

Primary Examiner—John W. Caldwell
Assistant Examiner—Daniel Myer
Attorney—Hood, Gust, Irish, Coffey & Lundy

[57] ABSTRACT

For use in monitoring a safety device switch through which alternating current flows, monitoring means comprising a rectifier connected across such a switch to provide a direct current output when the switch is opened, a light and a capacitor connected in series across the output of the rectifier, a signal light, and a light-actuated silicon controlled rectifier. The silicon controlled rectifier is positioned and arranged to be actuated or rendered conductive by light from the light which is in series with the capacitor. When the safety device switch is opened, direct current provided by the rectifier charges the capacitor to a predetermined level. During this charging process, the light in series with the capacitor produces light for actuating the silicon controlled rectifier. The power source for the signal light and the silicon controlled rectifier may be a separate, low voltage direct current power source completely separate from the power source producing the current flowing through the safety device switch.

9 Claims, 1 Drawing Figure

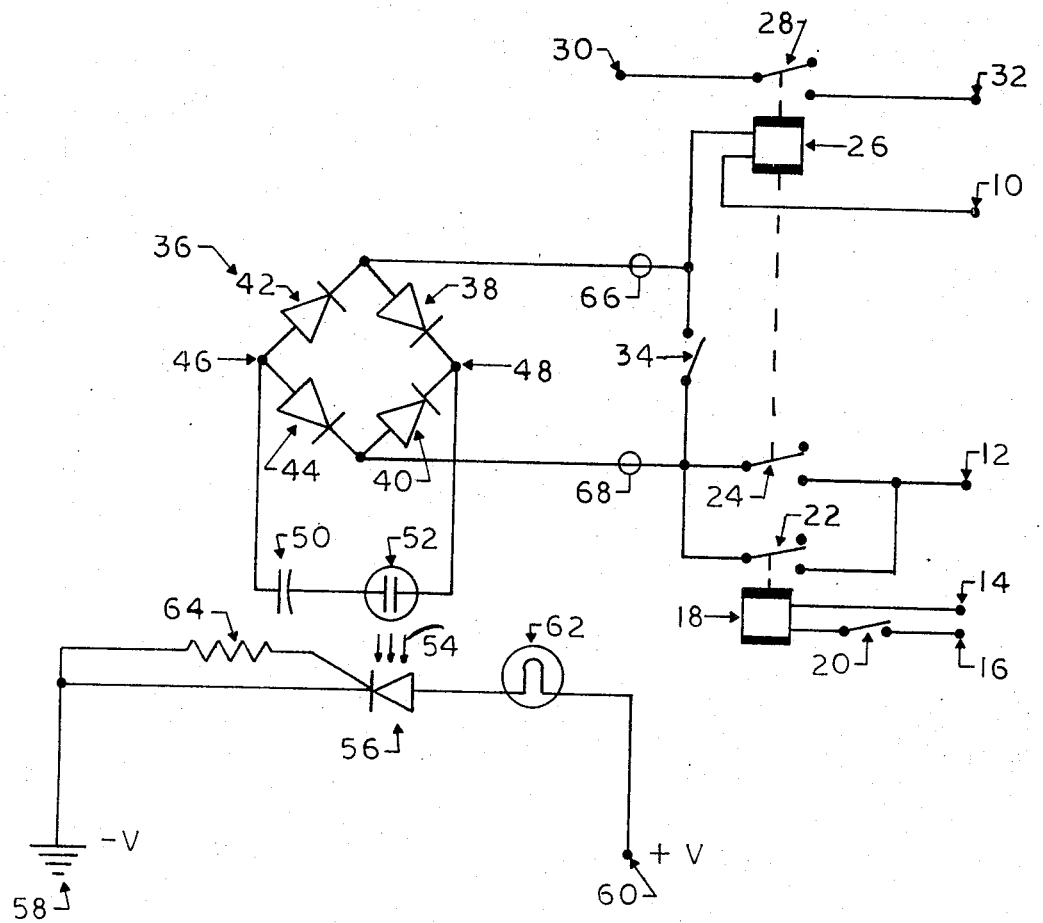
INVENTOR.
MICHAEL R. LAVELLE
BY
HOOD, GUST, IRISH, LUNDY & COFFEY

SAFETY DEVICE MONITORING SYSTEM

This invention relates to safety device switches, and more particularly to the provision of economical and reliable and effective means for monitoring the condition of such switches.

It is a primary object of my invention to provide means for monitoring a safety device switch, or any switch through which alternating current flows, and providing a signal when that switch has been, for some reason, opened. My system includes a sensing portion and signaling portion isolated from each other in a manner such that disturbances or failures in one portion will not result in a disturbance or failure in the other portion. Isolation electrically and mechanically is achieved by constructing the two portions such that the signaling portion is operated by light produced by the sensing portion. One objective of my invention is to have the signaling portion energized by a low voltage direct current power source which is completely separated from the power source producing the current flowing through the safety device switch.

My invention, therefore, comprises means for use in monitoring a switch through which alternating current flows, the monitoring means including rectifier means connected across such a switch to provide a direct current output when the switch is opened. The rectifier means is, therefore, a primary portion of my sensing system. Light means and capacitance means are connected to the output of the rectifier means to provide a light output when the switch being monitored is opened.

The signaling portion of my system includes a signal means, such as a signal light or a bell, and light-actuated switch means for energizing the signaling means, the light-actuated switch means being positioned and arranged to be actuated by light from the light means connected to the rectifier means.

My monitoring means includes means for providing a low voltage direct current power source separate from the alternating current source producing the current flow through the switch being monitored. The said signal means and light-actuated switch means are connected in series across the direct current source such that the light-actuated switch means is rendered conductive by light to energize the signal means. The light-actuated switch means is a latching-type switch means such that once it is rendered conductive, it will stay conductive continuously to energize the signal means until the direct current source is removed from the anode of the switch means.

In the illustrative embodiment, the rectifier means includes a full-wave rectifier, the light means and capacitance means being connected in series across the output of the rectifier such that the light means is ignited by direct current flow when the monitored switch is opened until the capacitance means is charged to a predetermined level. Once the capacitance means is charged to such a predetermined level, current will not flow through the light means.

While I have shown and described only one monitoring means for one switch, it will be appreciated that I may provide a plurality of such monitoring means for monitoring a plurality of such switches. I may place the monitoring means on a conventional control panel for viewing by maintenance personnel. The packaging of the components of my monitoring means may be accomplished to suit the particular monitoring application. As will be discussed hereinafter, since the operative connection between the sensing portion of my system and the signaling portion of my system is accomplished by light, the packaging should provide for proper optical shielding to prevent energization of the signaling portion by light not produced by the sensing portion.

Other objects and features of my present invention will be discussed hereinafter.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawing:

The single FIG. is a schematic view of a portion of a typical operating system including a safety device switch and my monitoring means monitoring that switch.

Turning now to the drawing, it will be seen that I have shown alternating current terminals 10, 12. These terminals may be connected, for instance, to a 110 volt alternating current power source. I have also illustrated terminals 14, 16 across which is connected the coil of a relay 18, the terminals 14, 16 representing, for instance, another or the same alternating current power source. In series with the coil of the relay 18 is a control switch 20 which may be, for instance, a conventional thermostat switch. The relay 18 operates a switch 22 which is in parallel with another switch 24 operated by a load relay 26. When the switch 20 is closed, the relay 18 closes the switch 22. The coil of the load relay 26 is connected across the power terminals 10, 12. The relay 26 also operates another switch 28 which closes a circuit between points 30 and 32. The mechanical connection between the relay 26 and the switches 24, 28 is shown by dashed lines. In series with the coil of the relay 26 is a safety device switch 34 which is normally closed. Also in series with the coil of the relay 26 and the switch 34 is the other switch 24 operated by the relay 26.

A full wave rectifier, indicated generally at 36 and comprising diodes 38, 40, 42 and 44 connected in a conventional fashion is connected in parallel with the switch 34. Across the output terminals 46, 48 of this bridge rectifier is a series circuit including a capacitor 50 and a neon lamp 52.

The switch 34, which is normally closed, is the safety device switch being monitored. If, for some reason, this switch opens, the full wave bridge rectifier 36 will apply a direct current potential across the terminals 46, 48 to charge the capacitor 50. The voltage required to charge this capacitor 50 is sufficient to ignite the neon lamp 52. The ignition of the neon lamp 52 produces light as indicated by the arrows 54. This light is directed at the light sensitive surface of a light-actuated silicone controlled rectifier 56.

The rectifier 56 is an electronic switch which completes the circuit across a low voltage source indicated at terminals 58, 60, the terminal 60 representing the positive side of the low voltage source. There is a lamp 62 connected between the anode of the rectifier 56 and the terminal 60 so that, when the rectifier turns on, current can flow from the terminal 60 through the lamp 62 and the anode-cathode circuit of the SCR 56 to the ground terminal indicated at 58. The gate circuit of the SCR 56 is connected via a resistor 64 to ground as illustrated.

I have referred to the load relay 26 as being the relay which actuates the load switch 28 to energize, for instance, the cooling motor contactor of a chiller or some other such device. This control system can be used with any number of systems such as heating systems and cooling systems. While I have indicated that the switch 20 may be a thermostat, it may be any type of control element such as a humidistat, pressure sensing switch, etc. The function of the switch 20 is to close a circuit upon a happening such as an increase in temperature or a decrease in temperature.

When the switch 34 opens, the charge builds up on the capacitor 50 thereby causing current to stop flowing from terminal 10 to terminal 12. In this way, normal operation of the safety device switch 34 is permitted. Particularly, the function of the safety device switch 34, when it opens, is to drop the load relay 26 out. It will be appreciated that, when the switch 34 opens, an alternating current voltage is applied to the rectifier 36 to produce a direct current voltage to charge the capacitor 50. Once this capacitor 50 is charged to a prescribed level, current will no longer flow through the bridge network and across the terminals 10 and 12 to hold the relay 26 in. That is, when the voltage appears across terminals 46 and 48, lamp 52 will immediately ignite and stay lit until capacitor 50 is charged to its maximum capacity. When the capacitor 50 is charged to its prescribed level, current will not flow between the points 46, 48 and then the lamp 52 will not be ignited.

The SCR 56 is a latching-type SCR in that, once it is turned on by light, it will not turn off until the voltage is removed from its anode. Thus lamp 62 will continue to stay lit even if switch 34 goes to the closed position. In this way a service technician can recognize the specific safety switch that opened even though it has gone to the closed position.

An important advantage of this system is that the monitoring circuit including the SCR 56 and lamp 62 are operated from a separate, low voltage source, not involved with the power source across the terminals 10 and 12 or the terminals 14, 16.

The only connection between the monitoring system and the control system is the light emitted from the lamp 52 and directed at the rectifier 56. There is no other mechanical or electrical connection. This gives good isolation characteristics to assure reliability of the monitoring system and, importantly, to prevent any type of reaction between the monitoring system and the control system.

The switch 34 can be a safety device such as high pressure control, oil pressure control, flame safety control, low water control, etc. The switch 28 may be a switch for operating any type of appliance such as a motor, compressor, gas valve, etc.

Relay switch 24 is mechanically held closed by load relay 26 and thereby completes the circuit between terminals 10 and 12 even if switch 22 moves to the open position. Thereby, when switch 34 opens, the load relay 26 drops out causing switch 24 to open. The load relay 26 may not be energized again unless switch 20 closes.

In recapitulation, when switch 20 is closed, relay 18 operates to close switch 22. Then, if safety switch 34 is closed, i.e., normal operating conditions exist, current will flow from terminals 10 and 12 to energize relay 26 which, in addition to closing load contacts such as the contact 28, closes the switch 24. Once the switch 24 is closed, i.e., the relay 26 is energized, the switch 22 may open because of a lack of current through the coil of the relay 18 caused by opening of the switch 20. Upon opening of switch 34 due to a happening such as a loss of pressure, a loss of flame, etc., current must stop flowing between the terminals 10 and 12 thereby to cause relay 26 to drop out. In this way, the safety switch 34 prevents normal operation. With sensor wires 66, 68 connected across switch 34, the full wave bridge rectifier 36 is connected in parallel across switch 34. When switch 34 opens, the alternating current across terminals 10, 12 is impressed across rectifier 36 and, therefore, across terminals 46, 48. Direct current then flows through the lamp 52 and into the capacitor 50. The neon lamp 52 ignites and stays lit until capacitor 50 is fully charged, at which time direct current and, therefore, alternating current between terminals 10, 12 stops flowing. In this arrangement, therefore, the safety device monitoring system senses when a safety switch, such as switch 34, opens upon a failure to operate normally but the monitoring system does not interfere with the normal operation of the system being monitored.

The safety switch 34 need not be in series with switches 22, 24 and the coil of the relay 26. The switch 34 may be, for instance, only in series with the coil of the relay 26 or switch 24. In any case, the switch 34 is to interrupt the flow of alternating current in a circuit thereby to act as a safety device.

What is claimed is:

1. In combination, a circuit for connection across an alternating current power source comprising a safety switch through which alternating current flows, load switch means connected to said safety switch and dominated thereby, and means for monitoring said safety switch, said monitoring means including rectifier means connected across said safety switch, said rectifier means including direct current output terminals, light means and capacitance means connected across said output terminals, signal means, and light-actuated switch means for connecting said signal means to a second power source, said light-actuated switch means being positioned and arranged so that its light sensitive surface receives light from said light means, said light-actuated switch means being rendered conductive by such light to energize said signal means.

2. The combination of claim 1 in which said rectifier means includes a full wave rectifier, said light means and capacitance means being connected in series such that said light means is ignited by current flow when said safety switch is open until said capacitance means is charged to a predetermined level, and said light-actuated switch means including a latching-type light-actuated silicon controlled rectifier.

3. The combination of claim 2 in which said signal means includes a light connected in series with the anode-cathode electrodes of said silicon controlled rectifier, said silicon controlled rectifier being arranged to conduct low voltage direct current from such a second source to energize said light.

4. The combination of claim 2 in which said light means includes a neon lamp.

5. For use in monitoring a switch through which alternating current flows, monitoring means comprising rectifier means connected across such a switch to provide a direct current output when the switch is opened, light means and capacitance means connected across the output of said rectifier means, signal means, and light-actuated switch means for energizing said signal means, said light-actuated switch means being positioned and arranged to be actuated by light from said light means.

6. The monitoring means of claim 5 including means for providing a low voltage direct current power source separate from such an alternating current source, said signal means and light-actuated switch means being connected in series across the direct current source such that said light-actuated switch means is rendered conductive by light to energize said signal means.

7. The monitoring means of claim 5 in which said rectifier means includes a full wave rectifier, said light means and capacitance means being connected in series such that said light means is ignited by direct current flow when the monitored switch is opened until said capacitance means is charged to a predetermined level, said light-actuated switch means including a latching-type light-actuated silicon controlled rectifier.

8. The monitoring means of claim 6 in which said rectifier means includes a full wave rectifier, said light means and capacitance means being connected in series such that said light means is ignited by direct current flow when the monitored switch is opened until said capacitance means is charged to a predetermined level, said light-actuated switch means including a latching-type light-actuated silicon controlled rectifier.

9. The monitoring means of claim 8 in which said signal means includes a light connected in series with the anode-cathode electrodes of said silicon controlled rectifier, said silicon controlled rectifier being arranged to conduct low voltage direct current to energize said light.

* * * * *